United States Patent Office 3,411,872
Patented Nov. 19, 1968

3,411,872
METHOD OF PRODUCING NONHYGROSCOPIC SODIUM ALUMINUM PHOSPHATE
Leo B. Post, New City, N.Y., and Julian E. Blanch, Stamford, Conn., assignors to Stauffer Chemical Company, New York, N.Y., a corporation of Delaware
No Drawing. Filed July 24, 1967, Ser. No. 655,351
5 Claims. (Cl. 23—105)

ABSTRACT OF THE DISCLOSURE

The process for manufacturing sodium aluminum phosphate (SALP) includes adding reactive sodium and aluminum compounds to a solution of phosphoric acid, concentrating the solution to cause crystallization of the SALP and wherein an ionizable compound is added before crystallization for surface modification. Controlled sizing of the SALP is accomplished in the presence of an alkali metal ion, which modifies the surface of the final particle. The sizing is preferably controlled by wet milling with immediate surface modification being obtained by the alkali metal ion incorporated in the solvent solution.

Background of the invention

Sodium aluminum phosphate is a well recognized and approved food additive used for example as a leavening acid in baked products, as a melt-controlling additive in cheese and as a meat binding agent. The compound is often represented symbolically as NALP, SAP·$H_2O$, SAP·$4H_2O$ or SALP (as referred to hereinafter). At present SALP is mostly used in the baking art such as in biscuit mixes, pancake mixes, waffle mixes, cake mixes, doughnut mixes, muffin mixes, canned biscuits, self-rising flours and frozen rolls. Ideally the SALP should be non-hydroscopic. SALP is, however, inherently hydroscopic and will absorb a large quantity of atmospheric moisture. One attempt at producing non-hygroscopic SALP is described in U.S. Patent 3,205,073 which relates to the production of potassium modified SALP. Although the SALP produced by the method of that patent is satisfactorily non-hygroscopic, it is also desirable to improve the flow of the SALP while maximizing its nonhygroscopicity.

The flow characteristics of SALP can be highly improved by controlling its sizing. Although wet milling of SALP (in order to avoid excessive reduction) might be thought to be an answer to controlled sizing, the wet milling in water systems cannot be made to work because of the high solubility of SALP in water which results in gumming. Accordingly, wet milling has not been successfully used for improving the work handling characteristics of SALP by controlling its sizing.

Brief summary of the invention

An object of this invention is to provide a method of manufacturing nonhygroscopic SALP having improved handling characteristics.

In accordance with this invention a SALP producing method such as described in U.S. Patent 3,205,073 which uses an alkali metal ion, preferably by means of solvent suspension, is modified to combine the method with controlled sizing so as to gain both improved resistance to moisture attack and improved handling of the SALP.

Advantageously the solvent suspension is utilized to permit the controlled sizing by wet milling. In turn surface modification is immediately obtained by the potassium incorporated in the solvent suspension. The combination of the two features permits the manufacture of a product possessing superior physical characteristics than heretofore obtained.

The resultant particle size of the SALP is desirably in a range of 40 to 100 microns. The components of the SALP (sodium, aluminum and phosphate) are preferably in the ratio by weight of 1:3:8, respectively, and the SALP crystals are wet milled in the presence of, for example, a methanol treating solution. This treating solution preferably comprises from 40 to 100% by weight of methanol, the balance if any being water. It also includes the potassium ion in the form of a preformed phosphate salt, or as the hydroxide with phosphoric acid, which is dissolved in a small amount of water before being added to the methanol solution. Other suitable solvent systems include about 40 to 100% acetone, ethanol, other lower alkanols of about 1 to 4 carbons (e.g., isopropanol and/or the butanols) and other water-miscible solvents, together with about 60 to 0% of water.

Detailed description

Example I.—A treating solution consisting of 67.5 pounds of methanol, 40 pounds of water and 150 grams of $K_2HPO_4$ was made up by first dissolving the dipotassium phosphate in the water and then adding the methanol to the solution. The resultant liquor contained a whitish precipitate.

Milling was accomplished by charging 2¼ lbs. of crystallized 1:3:8 SALP, wet with its mother liquor, into the feed hopper of a Fitzmill while simultaneously adding 8½ lbs. of the treating solution. The material discharged from the mill in the form of a slurry which was caught by a 17 inch wringer where the liquor was separated from the SALP using a regular press cloth as the wringer screen. The wringer was positioned directly beneath the mill. The final cake was washed with one quart of pure methanol, spun dry for ten minutes and finally dried at 80° C. The product when screened passed through an 80 mesh screen with 31% remaining on the screen and 69% passing through.

A second treating solution was prepared by dissolving 136 grams of potassium hydroxide and 140 grams of 85% phosphoric acid in 40 pounds of water and then adding 67.5 pounds of methanol. When this was employed in the same milling and recovery procedure, substantially the same controlled size SALP product resulted.

Example II.—A crystallizer discharge of the same type of wet SALP precipitate as in Example I was milled in a Fitzmill in the presence of a 68% methanol-water solution containing dipotassium phosphate. In order to reduce the amount of coarse material and obtain especially fine milling of the material the screen was 80% blocked off. The slurry which was discharged from the mill was immediately run into a 17 lb. capacity centrifuge. For every 20 lbs. of wet crystallizer discharge, 43 lbs. of the methanol solution were used. This treating solution contained 85 grams of $K_2HPO_4$ or 0.5% $K_2O$ per 20 lbs. of 1:3:8 SALP and had enough methanol and water added to it to maintain the proper concentration and offset losses due to centrifuging. When adding the dipotassium salt to the aqueous methanol, the salt was first dissolved in enough water to give a 40% solution which, in turn, was added to the methanol. This step was desirable to assure dissolving the salt. The final solution contained a white gel-like precipitate which had a tendency to settle out and accordingly it was stirred before using.

To obtain reasonably good contact of the 1:3:8 SALP crystallizer discharge and the methanol solution, 2 lbs. of SALP and 4 lbs. 6 ozs. of the solution were fed to the mill simultaneously and allowed to clear the mill. The next slug of the same amounts was then fed. A total of seven recycle batches was made of the methanol liquor.

The average solution loss per 43 lbs. was 7 lbs. or 16%. This loss, however, can be considerably reduced by a large scale operation. Air separation of the Fitzmilled SALP 1:3:8 in an air separator resulted in a fine fraction that left only a trace on the 100 mesh screen.

The air separator indicated above included a small fan and six blades on both the top and bottom. A rerun of the oversize material yielded only a minor amount through the 100 mesh screen. Accordingly, the first pass through the screen was sufficient to classify the material.

The Fitzmill referred to in both of these examples was a commercial Model D Comminuting Machine of the W. J. Fitzpatrick Company of Chicago. The speed of the mill shaft was 3200 r.p.m. and the screen used had 1/64 inch holes.

This procedure was repeated with comparable success using 100% methanol and only sufficient water to pre-dissolve the $K_2HPO^4$.

Example III.—A quantity of 200 lbs. of 1:3:8 SALP crystallizer discharge was treated with a methanol-water solvent and a potassium salt solution. The methanol-water solvent was prepared by starting with 325 parts by volume $H_2O$ which was made up to 1000 parts by adding the requisite volume of methanol. For the preparation of the potassium salt solution this solvent was used with 74.6 g. KCl/liter of solution. Two hundred and fifty ml. of the resulting 0.3 N KCl solution and 250 ml. of the pure methanol-water solvent were mixed in a beaker. To this mixture were added 100 g. of the 1:3:8 SALP. The slurry was stirred for 3–5 minutes and filtered with the aid of vacuum. The solid was washed free of Cl ion using fresh solvent (about four washes of 200 ml. each) followed by a single wash with pure methanol. The solid was dried at 80° C. for 60 min., comminuted by ball-milling and found to be much improved in both its non-hygroscopicity and its flow characteristics.

When this procedure was repeated using a 0.3 N $K_2SO_4$ solution instead of the KCl, substantially the same product was obtained.

It has been found that 1:3:8 SALP is capable of picking up or exchanging between 30 and 80 milliequivalents of alkali metal cation, e.g., $K^+$ ion, for 100 g. of SALP. Whether the exchange is on the high or the low end of this range is dependent on several factors, the major factor being the final pH of the slurry during the $K^+$ ion treatment. For example, there is a low exchange at low pH and a high exchange at high pH. One way of controlling the pH is by the choice of alkali metal salt. With KCl, the final pH will be low (about 2.5–2.8) and therefore only about 30 m. eq./100 g. of exchange will be obtained. Thus at least this amount of $K^+$ should be supplied. Higher amounts are more desirable to take advantage of mass action effects.

The potassium ion may be supplied from any potassium compound having an organic or inorganic anion and which will ionize in either organic or inorganic solvents to furnish a free and available potassium cation. Among those with inorganic anions, the potassium salts such as potassium chloride, potassium bromide, potassium iodide, potassium fluoride, tri-potassium orthophosphate, potassium nitrate, potassium hydrovide, potassium carbonate, potassium sulfate, and monobasic potassium phosphate are to be preferred. The suitable organic-anion compounds include, for example, potassium tartrate, potassium acid tartrate, potassium acid phthalate and potassium acetate.

Obviously many other variations of this new process are possible without departing from the spirit of the invention. For example other methods of finely dividing or comminuting the treated SALP can be used instead of milling. Alternatively, the mill can be altered by changing the size and shape of the hammers or balls and/or the amount of screen opening to yield the maximum amount of particles in the desired range. Additionally, the type of milling can be varied by using, for example, pebble mills, ball mills and rod mills with controlled holding time. Other variations include eliminating the final methanol wash. In this case, however, caking may result unless there is vacuum drying or some other method of drying. Moreover, instead of utilizing dry classification to obtain correct particle size, wet classification could be used, such as hydroclones in place of an air separator. In such a modification the slurry is pumped through the hydroclones with the correct particle size being removed and the coarse particles recycled for regrinding.

What is claimed is:

1. In the method of manufacturing 1:3:8 sodium aluminum phosphate by crystallizing it from a reaction medium of sodium and aluminum compounds and phosphoric acid followed by comminuting the crystals to a substantially uniform size, the improvement which comprises first slurrying the crystals in a solvent system containing from about 40% to 100% by weight of an alkanol having 1 to 4 carbon atoms and from about 60% to 0% of water in the presence of between about 30 and 80 milliequivalents of potassium ion per 100 grams of the SALP, and then effecting the comminution.

2. The method set forth in claim 1 wherein the comminution is effected by wet milling.

3. The method set forth in claim 2 wherein the milling is controlled to result in a particle size range of 40 to 100 microns.

4. The method set for in claim 1 wherein the alkanol is methanol.

5. The method set forth in claim 4 wherein the potassium ion is supplied as $K_2HPO_4$ which is dissolved in water, before being added to the methanol solvent system.

References Cited
UNITED STATES PATENTS 3,205,073    9/1965    Blanch et al. _____ 23—105

OSCAR R. VERTIZ, *Primary Examiner.*

L. A. MARSH, *Assistant Examiner.*